United States Patent [19]

Paley

[11] Patent Number: 4,844,110
[45] Date of Patent: Jul. 4, 1989

[54] CONTROL SYSTEM FOR REMOTELY CONTROLLED MOTOR OPERATED VALVE

[75] Inventor: Robert M. Paley, Shavertown, Pa.

[73] Assignee: The Phasor Corporation, Shavertown, Pa.

[21] Appl. No.: 212,943

[22] Filed: Jun. 29, 1988

[51] Int. Cl.$^4$ .............................................. F16K 31/04
[52] U.S. Cl. ....................... 137/1; 251/129.04; 251/129.12
[58] Field of Search ............... 251/129.12, 129.04; 137/1

[56] References Cited

U.S. PATENT DOCUMENTS

| | | |
|---|---|---|
| 3,972,506 | 8/1976 | Azuma . |
| 4,097,786 | 6/1978 | Lund . |
| 4,099,704 | 7/1978 | Okumura . |
| 4,345,292 | 8/1982 | Jaeschke et al. .............. 361/94 |
| 4,455,012 | 6/1984 | Gupta . |
| 4,584,902 | 4/1986 | Fry . |

OTHER PUBLICATIONS

NRC, Office of Insp. and Enforcement IE Bulletin No. 85-03 Entitled "Motor-Operated Valve Common Mode Failures During Plant Transients Due to Improper Switch Settings" Dated 11-15-85.
NRC Information Notice No. 87-40 Entitled "Backseating Valves Routinely to Prevent Packing Leakage" Dated 8-31-87.
Publication Entitled "Application of Diagnostics to Determine Motor-Operated Valve Operational Readiness" by D. M. Eissenberg, Oak Ridge National Laboratory, Oak Ridge, Tenn.

Primary Examiner—Arnold Rosenthal
Attorney, Agent, or Firm—Willian, Brinks, Olds, Hofer, Gilson & Lione

[57] ABSTRACT

A control system for controlling the operation of a motor operated valve including a limit switch to stop the opening of the valve element of the valve at an open position which is short of its backseated position, a selector switch to override the limit switch ot permit the valve element to be moved past the open position toward the backseated position, and a digital protective relay to repeatedly measure current flow through the valve motor, to compare current readings with setpoint values and to rapidly discontinue motor current flow when current readings exceed setpoint values.

20 Claims, 4 Drawing Sheets

CONTROL SYSTEM FOR REMOTELY CONTROLLED MOTOR OPERATED VALVE

BACKGROUND OF THE INVENTION

1. Field Of The Invention

This invention relates to a system for controlling the operation of a remotely controlled motor operated valve to control the force applied to the valve through the motor during the seating and backseating of the valve. More particularly, this invention relates to a system for eliminating, reducing or detecting packing leaks in a motor operated valve in an inaccessible location by electrically backseating the valve in a manner which does not pose a risk of damage to the components of the valve from the backseating operation. Additionally, when normal controls fail and render the valve inoperable this invention provides a substitute control system which can be aligned and selected to emulate normal controls thereby preventing damage to the components of the valve from a normal seating operation. Finally, the invention provides accurate recording of motor current signature for diagnostic purposes.

2. Description Of The Prior Art

Remotely controlled motor operated valves are widely used in fluid handling systems in nuclear power plants and other types of industrial plants where the valves may be inaccessible to plant personnel during the operation of the plant due to a hazardous condition which may prevail at the location of the valve, for example, a nuclear radiation environment which may prevail in a nuclear power plant containment building where many valves of this type are used. A similar problem may be encountered with respect to a motor operated valve in an electric power plant operated on fossil fuels due to the possibility of a steam leak in the environment of such valve, or with respect to a motor operated valve in a chemical plant due to the toxic nature of various fluids which are handled in such plants.

Typical valves which are used in fluid handling systems, for example, gate valves and globe valves, are subject to leakage at the packing around the movable stem that carries the gate or globe valve member, and it is known that such leakage can frequently be corrected, or at least substantially reduced, by backseating the valve, that is, by driving the valve past its normally opened position, where it is normally stopped by a limit switch in the valve actuator, so that it seats or nearly seats against a stop surface, called a backseat, at its maximum travel position. However, systems heretofore employed in the electrical backseating of a motor operated valve in an inaccessible location, for example, a system for bypassing the limit switch at the valve open position and then driving the valve toward its backseat until the locked rotor current of the valve motor is approached, are systems which are not reproducible and which pose the risk of damage to various components of the valve, such as valve stem failure, valve stem elongation, backseat damage, cracking of the stem nut, and damage to other valve components. These problems are extensively discussed in an Information Notice of the United States Nuclear Regulatory Commission, Office Of Nuclear Reactor Regulation, NRC Information Notice No. 87-40, dated Aug. 31, 1987 and entitled "Backseating Valves Routinely To Prevent Packing Leakage", and arise due to the relatively short period of time that elapses between the time that the motor current starts to increase as a result of the increasing torque which results from backseating, and the time when the valve is fully backseated. Further, since the system described in the aforesaid NRC Information Notice relies upon an operator to manually interrupt the motor current upon noticing an increase in the magnitude thereof, the system is not accurately reproducible from cycle to cycle of the same valve.

The Nuclear Regulatory Commission has emphasized other problems related to motor operated valves in an information bulletin of The United States Nuclear Regulatory Commission, Office of Inspection and Enforcement, NRC IE Bulletin #85-03, dated Nov. 15, 1985 and entitled "Motor-Operated Valve Common Mode Failures During Plant Transients Due To Improper Switch Settings." This bulletin discusses various problems with motor operated valve control system settings and sets forth a requirement that all licensees review and maintain all switch settings to ensure proper operation of safety related motor operated valves.

SUMMARY OF THE INVENTION

The aforesaid problems resulting from the electrical backseating of a remotely controlled motor operated valve are avoided in the present invention by a backseat control system which uses a digital protective relay to electrically interrupt motor current very quickly after an increase in motor current resulting from backseating is first detectable. A device of this type is capable of continuously sensing an alternating current and of interrupting current flow if current readings are above the setpoint values, thus permitting the backseating of the valve to be discontinued virtually instantaneously upon a measurable increase in motor operating current during backseating. Further, the system of the present invention is fully reproducible from cycle to cycle, thus making it possible to detect various types of valve malfunctions which result in increased valve motor operating current, for example, a chipped gear tooth, by recording valve motor operating current versus time on an analog recording chart and comparing the trace of current versus time to a previously established signature of the valve motor operating current.

Further, the recording and diagnostic features of this invention can directly aid in the performance of the requirements set forth in NRC IE Bulletin #85-03.

Finally, under conditions where motor operated valves are inaccessible for environmental reasons and the normal control system has failed and renders the valve inoperable the invention may be substituted as a temporary control system to emulate normal valve control and provide safe and reliable operation until normal controls can be restored.

Accordingly, it is an object of the present invention to provide a system for controlling the operation of a remotely controlled motor operated valve to control the backseating of the valve. It is also an object of the present invention to provide a system for electrically backseating a remotely controlled motor operated valve which does not pose a risk of damage to the components of the valve. It is also an object of the present invention to provide a reproducible system for measuring and recording the operating current of a motor operated valve motor in conjunction with the operation of control system switches to establish a signature for the motor control system as a way of detecting malfunctions therein.

For a further understanding of the present invention and the objects thereof, attention is directed to the drawing and the following brief description thereof, to the detailed description of the preferred embodiment and to the appended claims.

DETAILED DESCRIPTION OF THE PREFERRED EMBODIMENT

Figure 1:
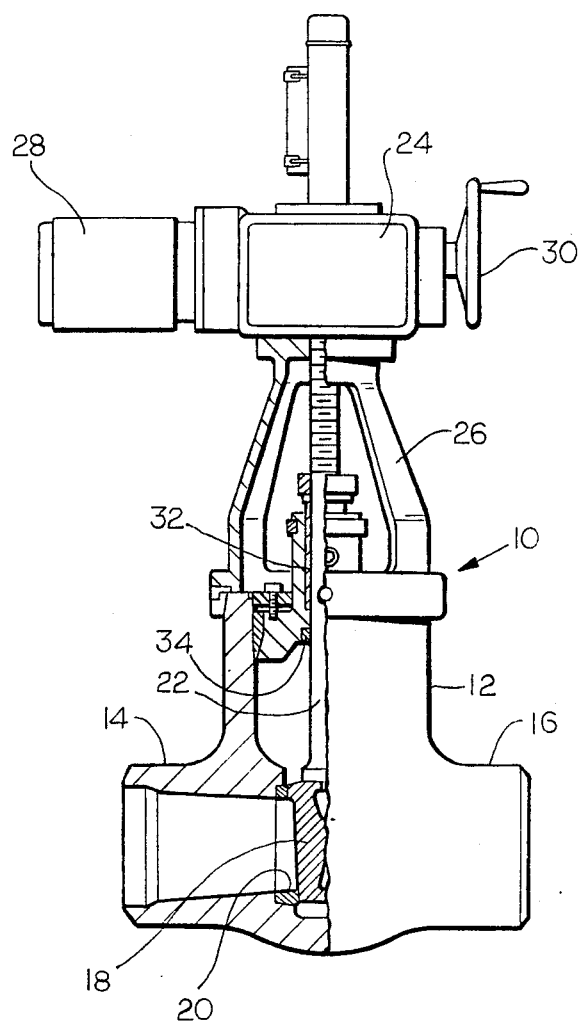
FIG. 1 is an elevational view, partly in section, of a typical motor operated gate valve which may be electrically backseated from a remote location by a control system according to the present invention.

A typical motor operated valve of the gate valve type is generally identified by reference numeral 10 in FIG. 1. The valve 10 includes a valve body 12 with an inlet 14, an outlet 16, and a gate type valve element 18 which, in the position illustrated, which is the closed position of the valve element 18, blocks fluid flow through the valve 10 by way of the inlet 14 and the outlet 16. In the illustrated closed position of the valve element 18, one of the sides thereof is firmly seated in a continuous pattern against an annular seating element 20 in the inlet 14 of the valve body 12 in fluid-tight surface to surface engagement therewith. The seating element 20 is made of a hard, wear-resistant metallic alloy, for example, the type of material which is sold under the brand name "Stellite". A similar seating element, not shown, is positioned in the outlet 16 of the valve body 12 to be engaged by the other side of the valve element 18. The valve element 18 is adapted to be retracted by vertical upward movement, in the orientation of the valve 10 shown in FIG. 1, to thereby open the valve 10 to the flow of fluid therethrough from the inlet 14 to the outlet 16. To that end, the valve element 18 is attached to an end of an elongated vertical member, which is usually referred to as a "stem", element 22 in the drawing, and the other end of the valve stem 22, which is threaded, is received in an actuator 24 at the top of a yoke portion "26 of the valve 10. The actuator 24, which is normally electrically operated by a motor 28 and which may also be manually operated by a handwheel 30, is available for purchase from Limitorque Corporation of King of Prussia, Pa., and imparts reciprocating motion to the stem 22 of the valve 10 by a worm gear, not shown, which engages the threaded portion of the stem 22.

To accommodate the reciprocating movement of the stem 22 of the valve 10 as the valve element 18 is reciprocated between the closed position shown in FIG. 1 and a raised position, not shown, the valve 10 also includes a fibrous sealing material surrounding the stem 22, which is usually referred to as "packing", element 32 in the drawing, to prevent leakage of the fluid flowing through the valve 10 through the passageway for the stem 22. As is known in the prior art, for example, as is described in the aforesaid NRC Information Notice No. 87-40, a valve such as the valve 10 is subject to leakage of the fluid flowing therethrough along the stem 22 and through the packing 32, and in a nuclear power plant there is usually a technical specification for maximum valve leakage for all containment chamber drywell leakage, for example, twenty-five gallons per minute for total drywell leakage and five gallons per minute for leakage from any unidentified source. Thus, to help avoid an unnecessary or unscheduled shutdown of the the plant due to valve leakage, it is important to be able to quickly test each of the various valves which are normally used in a given plant to be able to identify the source of the leakage, and to be able to quickly correct or at least substantially reduce the leakage problem. This is frequently done by a practice known "backseating", which is a known way to compress the packing around a valve stem to thereby reduce the fluid leaking therethrough. Thus, the valve 10 is provided with a second seating element 34 which will be engaged by the valve element 18 in its fully retracted or most highly elevated position, and the valve 10 will be fully backseated when the valve element 18 engages the second seating element 34. Of course, in a multiple valve installation, a significant reduction in drywell leakage following the backseating of any particular valve is a positive identification of the valve in question as a source of leakage.

Figure 4:
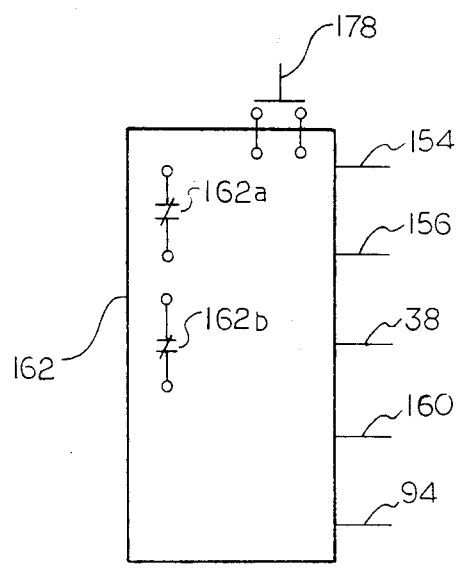
FIG. 4 is a composite schematic diagram of the circuit for the digital protective relay component of the control system shown in FIG. 2.
Figure 2:
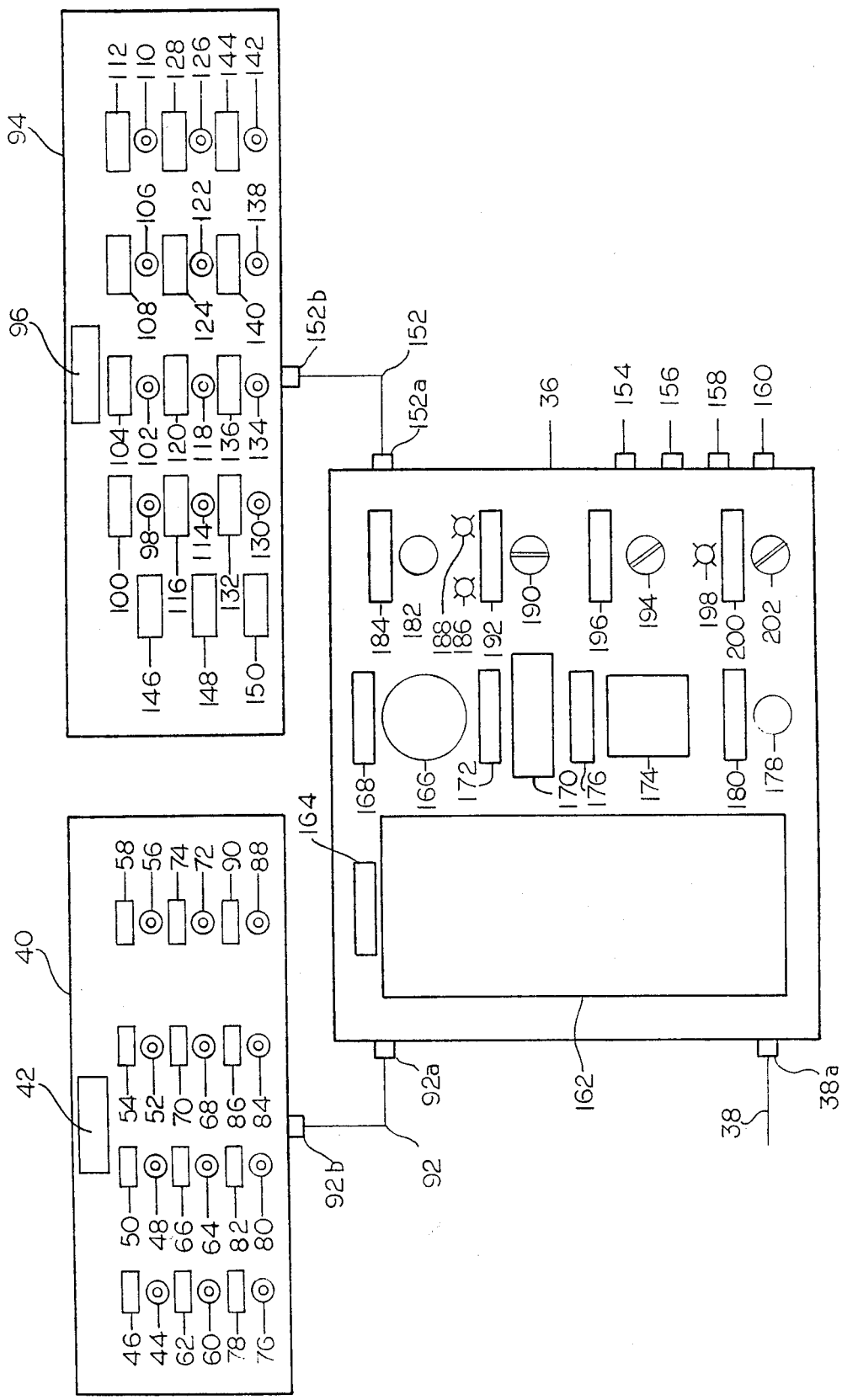
FIG. 2 is a block diagram of the preferred embodiment of a control system incorporating an electrical backseating feature for controlling the operation of a motor operated valve of the type illustrated in FIG. 1 from a remote location.
Figure 3:
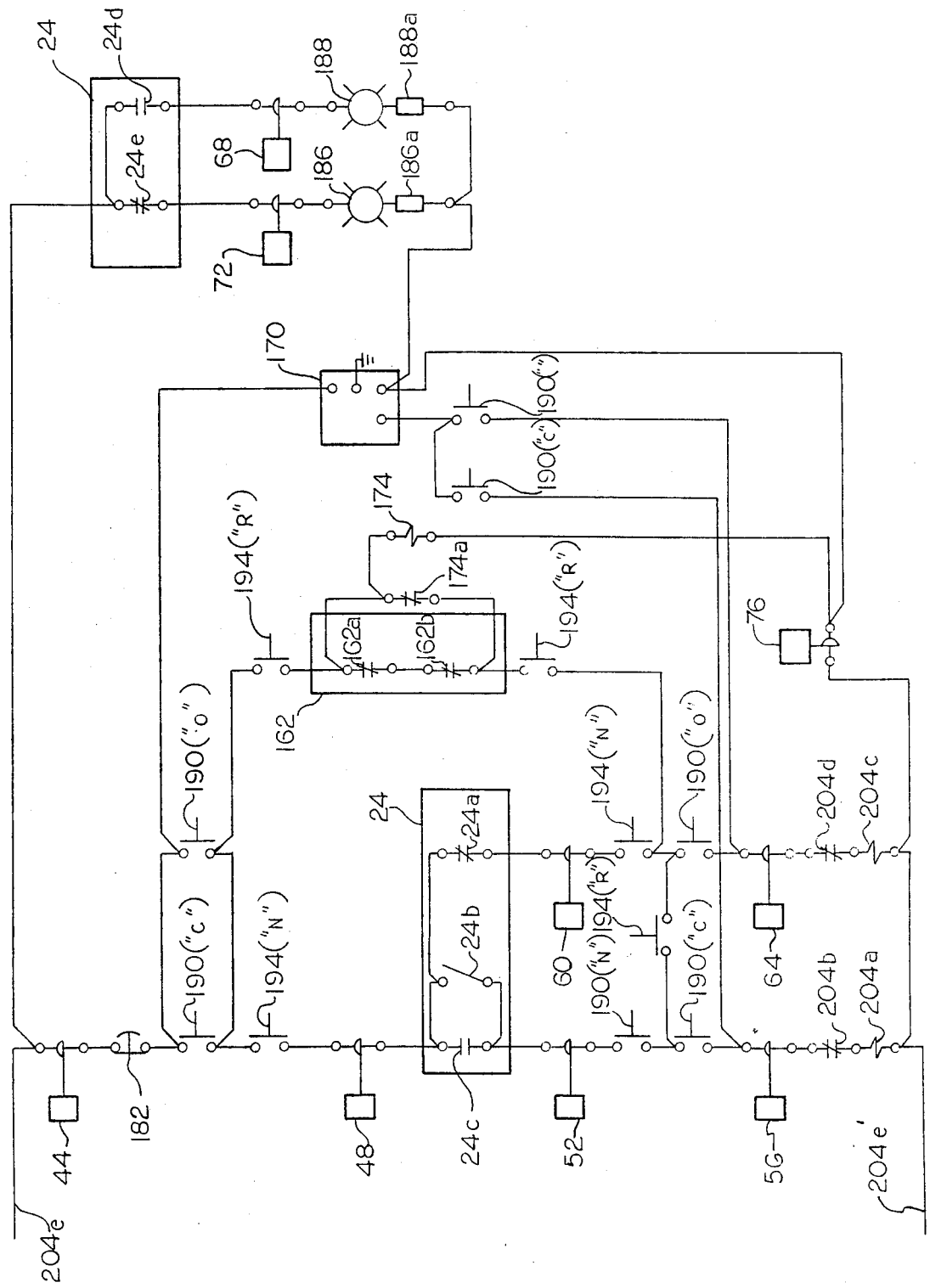
FIG. 3 is a composite schematic diagram of the circuit for the motor control system portion of the control system shown in FIG. 2.

In the operation of the valve 10, the retraction of the valve element 18 from the closed position shown in FIG. 1 to open the valve 10 to the flow of fluid therethrough will normally be stopped by a limit switch 24a, shown only in FIG. 3, within the actuator 24 at a position of the valve element 18 which is reached before the valve 10 is backseated. Thus, to backseat the valve 10 it is necessary to override the limit switch 24a which limits the opening of the valve element 18 of the valve 10 to a position short of its backseated position. FIGS. 2, 3, and 4 illustrate a control system for controlling the operation of the valve 10 which is capable of electrically achieving the backseating of the valve 10 and in doing so without damage to the second seating element 34 or any other component of the valve 10.

As is shown in FIG. 2, a control system according to the present invention utilizes a control panel 36 which receives alternating current electrical power, preferably at a voltage of approximately 120 volts, from an input line 38, which has a plug 38a. The input line 38, which is also shown in FIG. 4, actually includes two lines to complete the circuit, as is known in the art. The control panel 36 controls the operation of the motor 28, and is capable of being positioned at a remote location from the valve 10 to remotely control the operation of the motor 28 in case the valve 10 and the motor 28 are positioned in a hostile environment, for example, the high radiation environment of a nuclear power plant containment building. In any case, the control panel 36 also receives a plurality of electrical signals including control power from a plurality of line connectors terminated to a motor control interface 40, which is clearly identified by an engraved plate 42. The line connectors are identified by reference numerals 44, 48, 52, 56, 60, 64, 68, 72, 76, 80, 84, and 88 and terminate in a common cable 92. The cable 92 has a plug connector at each of its ends 92a and 92b, and includes a separate line for each of the line connectors 44 through 88. Each of the line connectors 44 through 88, except line connectors 80, 84, and 88 which are spares, is indicative of some aspect of the operation of the control system of FIGS. 2 and 3, and each of them is identified in FIG. 3. The identification plates for the line connectors 44 through 88 are identified, respectively, by reference numerals 46, 50, 54, 58, 62, 66, 70, 74, 78, 82, 86, and 90.

Figure 5:
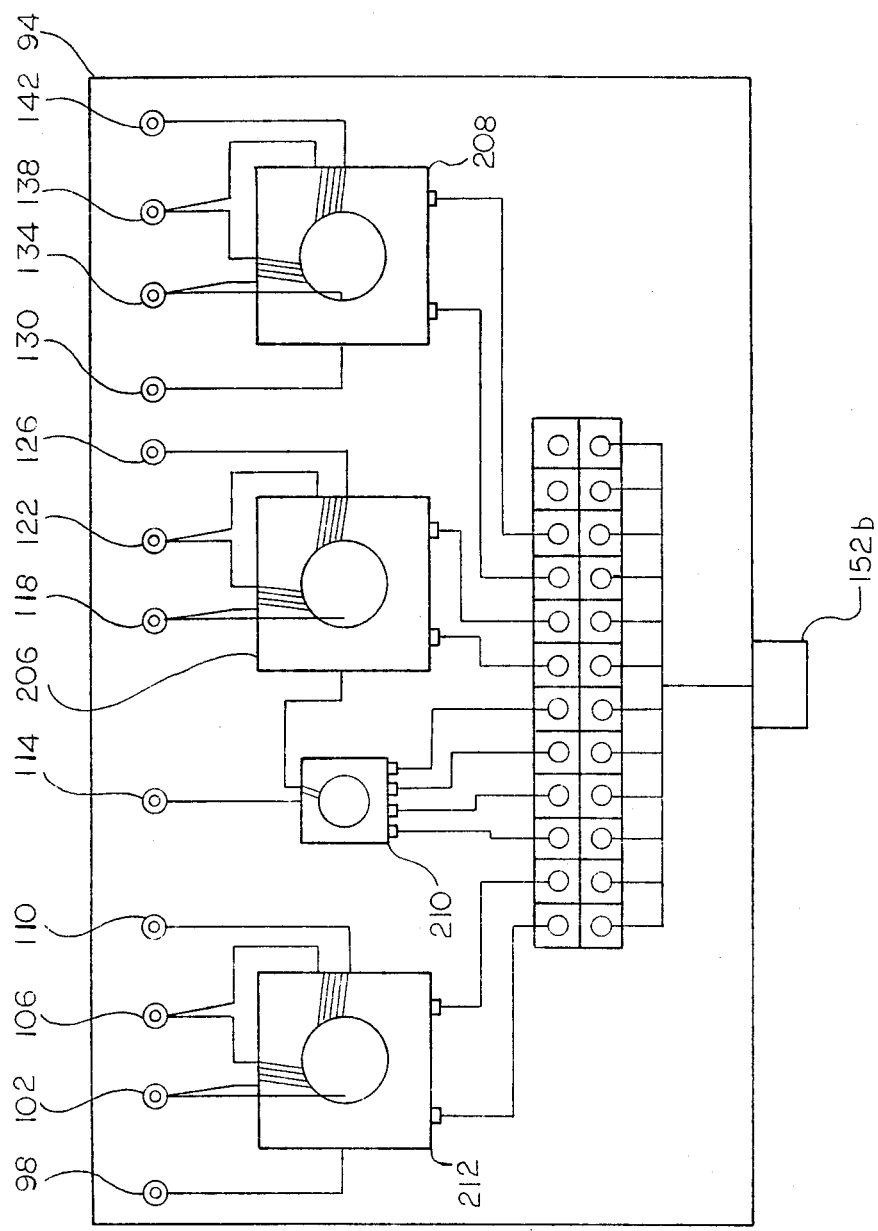
FIG. 5 is a composite diagram of the circuits for the motor current interface of the control system shown in FIG. 2.

The control system of FIGS. 2 through 5 is shown as being responsive to the operation of a motor current interface 94 for the current exhibited by the valve motor 28, and the motor current interface is clearly identified by an engraved plate 96. Engraved plates 146, 148, and 150 clearly identify the phase relationships of the input currents. The input currents are connected to terminals 98, 114, and 130, which are identified, respectively, by engraved plates 100, 116, and 132, and which indicate the power source to be connected. In order to complete the circuit path the load must be connected to one of three possible current transformer taps for each phase; taps 102, 106, or 110 for the first phase, taps 118, 122, or 126 for the second phase, and taps 134, 138, and 142 for the third phase, the actual tap that is selected for each phase being determined by the size of the valve motor 28. Engraved name plates 104, 108, 112, 120, 124, 128, and 136, 140, and 144 clearly indicate the current transformers taps 102, 106, 110, 118, 122, 126, 134, 138, and 142, respectively. Current transformers 206, 208 and 212 are shown in FIG. 5. In any case, electrical signals proportional to actual motor current are transmitted from the motor current interface 94 to the control panel 36 though a cable 152. The cable 152 has plug connectors 152a and 152b at its opposed ends and includes a separate line for each of the phase current signals. Additionally, as is shown in FIG. 5, a Hall effect sensor 210 for the second phase is contained within the motor current interface 94. The direct current power supply for the sensor 210 and the signal from the sensor 210 are also transmitted from and to the control panel 36, respectively, by way of the cable 152, and an output connection 158 (FIG. 2) is provided on the control panel 36 for connection to a chart recording device, not shown, for hard copy documentation of the signature of the current in the motor 28.

The control panel 36 also has a power switch 202 which is movable between an "on" position and "off" position to selectively connect the electrical power from the input line 38 to other elements of the control panel 36, with the "on" and "off" positions of the power switch being indicated by a suitably engraved panel 200 which is attached to the control panel 36. A signal lamp 198, which is preferably white in color, is wired into to the power circuit to provide a clearly visible indication of a power "on" condition. The control panel 36 is also provided with a selector switch 194 to select the operating stroke mode for controlling the operation ("operating mode selector") of the valve element 18 of the valve 10. The retraction of the valve element 18 is controlled by the selector switch 194 between a "normal" mode, in which the retraction of the valve element 18 is stopped by the limit switch 24a in the actuator 24 before it reaches the second seating element 34, and in the closed direction where the valve element 18 is stopped by the operation of a torque switch 24b when it is not bypassed by a monitor switch 24c which is also located in the actuator 24, and the "relay" mode in which the retraction of the valve element 18 overrides the torque switch 24b and the limit switch 24c. A suitably engraved plate 196 is provided to indicate the operating mode which has been elected by the selector switch 194. The limit switch 24c is normally selected to bypass the torque switch 24b only when the valve element 18 is in the fully retracted or open position.

The control panel 36 is also provided with a control switch 190 to control the operation of the valve 10 between a closed position "C", an open position "O" and a stop position "Stop", as indicated on a suitable engraved plate 192. The position of the valve element 18 is indicated by signal lamps 186 and 188, which are green and red, respectively, and which are connected in series with current limiting resistors 186a and 188a, respectively. The control switch 190 controls the operation of the actuator 24 through energization of motor contactor coils 204a and 204c respectively, and it is provided with an emergency stop such button 182, which is identified by suitably engraved plate 184. The control switch 190 is also provided with a valve stroke timer 170, shown schematically, to display the duration of the opening and closing cycles of the valve element 18 of the valve 10 during the operation of the valve 10. A suitably engraved plate 172 is provided to identify the valve stroke timer 170. Further, the control panel 36 is provided with a digital ammeter 166 to measure and display the current in the second phase of the motor 28, as sensed by the motor current interface 94. The digital ammeter 166 has operating modes which are keypad selectable on the surface of the ammeter 166 and which allow instantaneous, minimum and maximum values to be displayed. A suitably engraved plate 168 is provided to identify the ammeter 166.

A digital protective relay 162 is provided to discontinue the operation of the motor 28 of any particular valve 10 during the opening or closing of the valve 10 in the "relay" mode, as selected by the selector switch 194, when the current senses a predetermined value, and a reset push button 178, shown both in FIGS. 2 and 4, which is identified by a suitably engraved plate 180, is provided to reset the digital protective relay 162 after it has been tripped. The control system for the digital protective relay 162 utilizes two trip outputs 162a and 162b, respectively, from the digital protective relay 162. The trip output 162a is a primary high speed trip, and the trip output 162b is a backup trip. A contact 174a (FIG. 3) of a trip bypass time delay relay 174 (FIGS. 2 and 3) is connected in parallel with the trip outputs 162a and 162b, and the time delay relay 174 is dial selectable on the face of the time delay relay 174 to provide a predetermined "bypass" of the trip outputs 162a and 162b. A suitably engraved plate 176 is provided to identify the bypass time delay relay 174. Motor current input signals from the motor current interface 94 are also connected to the digital protective relay 162. A computer interface input and output port 156 is also provided for computer communication with the digital protective relay 162. An input 160 is provided for temperature inputs to the digital protective relay 162, if necessary. Further, an analog output port 154 from the digital protective relay 162 is provided for high speed recording and hard copy documentation of the operating characteristics of the stroke of the gate valve element 18 of the valve 10.

The digital protective relay 162, which requires 110 volt alternating current from a separate source, identified by reference numeral 38 in FIG. 4, is a type of motor management relay which is available from Multilin, Inc. of Markham, Ontario, Canada and utilizes an 8031 8 bit microcomputer to control the relay functions of such device. Such device is capable of comparing alternating current in a motor being controlled against set point values continuously and of interrupting motor operation if the measured current values exceed the selected point values. Thus, seating or backseating of the valve element 18 of the valve 10, during the "relay" mode of operation as selected by the selector switch 194, will be terminated reliability, reproducibly, and virtually instantaneously by the digital protective relay 162 upon an increase in motor current resulting from the start of seating or backseating of the valve 10, before any damage can be done to any component thereof as a result of such seating or backseating. A suitably engraved plate 164 is provided to identify the digital protective relay 162.

Electrical connections are made through the motor control interface 40 from a 120 volt alternating current power source, for example, a power source available at existing motor controls. The power input is identified by references 204e and 204e'. The motor 28 is disconnected by a contactor 204a in the closed direction and a contactor 204c in the open direction. The interlock contacts 204b and 204d prevent simultaneous operation of both the contactors 204a and 204c. The limit switches 24a and 24b and the torque switch 24b of the actuator 24 serve to provide position information relating to the position of the valve element 18 of the valve 10.

Although the best mode contemplated by the inventor for carrying out the present invention as of the filing date hereof has been shown and described herein, it will be apparent to those skilled in the art that suitable modifications, variations, and equivalents may be made without departing from the scope of the invention, such scope being limited solely by the terms of the following claims.

What is claimed is:

1. In combination with a valve having a valve element, said valve element being movable between a seated position and a backseated position, said valve comprising an alternating current motor and an actuator actuated by said motor for operating said valve element, means for controlling the operation of said motor comprising:
   means for sensing the flow of current through said motor and for comparing the current flow with setpoint values and means for discontinuing the flow of current when current flow exceeds setpoint values to prevent impact damage to said valve during the seating or backseating of said valve element,
   wherein said means for sensing comprises a digital protective relay having a microcomputer.

2. A combination according to claim 1 and further comprising the means for providing a signal representative of the flow of current through said motor.

3. A combination according to claim 1 and further comprising means for sensing the position of said valve element and for providing a visually detectable indication of the position of said valve element.

4. In combination with a valve having a valve element, said valve element being movable between a seated position and a backseated position, said valve comprising an alternating current motor and an actuator actuated by said motor for operating said valve element, means for controlling the operation of said motor comprising:
   means for sensing the flow of current through said motor and for comparing the current flow with setpoint values and means for discontinuing the flow of current when current flow exceeds setpoint values,
   wherein said means for sensing comprises a digital protective relay having a microcomputer,
   and further comprising means for providing a signal representative of the flow of current through said motor,
   wherein said motor is a three-phase motor and wherein said means for providing comprises a Hall effect sensor for sensing the flow of current through one of the phases of said three-phase motor.

5. In combination with a valve having a valve element, said valve element being movable between a seated position and a backseated position and having an open position between said seated position and said backseated position, said valve comprising an alternating current motor and an actuator actuated by said motor for operating said valve element, switch means normally stopping travel of said valve element as it moves toward said backseated position at said open position, and selector means for selectively overriding said switch means to permit said valve element to travel past said open position toward said backseated position, means for controlling the operation of said motor when said selector means has been selected to permit said valve element to travel past said open position to prevent the imposition of excessive forces on said valve as a result of the arrival of said valve element at said backseated position, said means for controlling comprising:
   means for sensing the flow of current through said motor and for comparing the current flow with setpoint values; and
   means for discontinuing the flow of current when current flow exceeds setpoint values.

6. A combination according to claim 5 wherein said means for sensing comprises a digital protective relay having a microcomputer.

7. A combination according to claim 6 and further comprising means for providing a signal representative of the flow of current through said motor.

8. A combination according to claim 6 and further comprising means for sensing the position of said valve element.

9. A combination according to claim 7 wherein said motor is a three-phase motor and wherein said means for providing comprises a Hall effect sensor for sensing the flow of current through one of the phases of said three-phase motor.

10. A combination according to claim 5 wherein said valve, said motor, and said actuator are located at a first location, wherein said selector means is located at a second location, wherein said second location is distant from said first location, and further comprising,
    electrical connector means extending between said first location and said second location.

11. A method for controlling the operation of a motor operated valve to control the movement of a valve element of said valve between a seated position and a backseated position, said motor operated valve having an alternating current motor and an actuator actuated by said motor for moving the valve element, said method comprising:
    sensing the flow of current through said motor;

comparing the flow of current through said motor against setpoint values; and rapidly discontinuing the flow of current through said motor when the flow of current through said motor exceeds setpoint values, wherein the step of comparing the flow of current through said motor against setpoint values and the step of rapidly discontinuing the flow of current through said motor when the flow of current exceeds setpoint values are performed by a digital protective relay having a microcomputer.

12. A method according to claim 11 and further comprising the step of:

providing a signal representative of the flow of current through said motor.

13. A method according to claim 11 and further comprising:

sensing the position of the valve element; and providing a visually detectable signal indicative of the position of the valve element.

14. A method for controlling the operation of a motor operated valve to control the movement of a valve element of said valve between a seated position and a backseated position, said motor operated valve having an alternating current motor and an actuator actuated by said motor for moving the valve element, said method comprising:

sensing the flow of current through said motor;

comparing the flow of current through said motor against setpoint values;

rapidly discontinuing the flow of current through said motor when the flow of current through said motor exceeds setpoint values; and providing a signal representative of the flow of current through said motor;

wherein said motor is a three-phase motor and wherein the providing of a signal representative of the flow of current through said motor is accomplished by providing a Hall effect sensor for sensing the flow of current through one of the phases of said three-phase motor.

15. A method for controlling the operation of a valve having a valve element which is movable between a seated position and a backseated position and which has an open position between said seated position and said backseated position, said valve comprising an alternating current motor and an actuator actuated by said motor for operating said valve element, said method comprising:

providing switch means to stop the movement of said valve element at said open position as said valve element moves toward said backseated position;

providing selector means to override said switch means to permit said valve element to be moved past said open position toward said backseated position; and controlling the operation of the motor when the selector means has been selected to permit said valve element to be moved past said open position toward said backseated position by repeatedly sensing the flow of current through said motor, comparing the flow of current with setpoint values, and rapidly discontinuing the flow of current through the motor when the current flow exceeds setpoint values.

16. A method according to claim 15 wherein the controlling of the operation of the motor is performed by a digital protective relay having a microcomputer.

17. A method according to claim 16 and further comprising:

providing a signal representative of the flow of current through the motor.

18. A method according to claim 17 and further comprising:

sensing the position of the valve element.

19. A method according to claim 17 wherein the motor is a three-phase motor and the providing of a signal representative of the flow of current through the motor is performed by means of a Hall effect sensor.

20. A method according to claim 15 wherein said valve, said alternating current motor and said actuator are located at a first location, wherein said selector means is located at a second location, wherein said second location is distant from said first location, an further comprising:

providing electrical connector means extending between said first location and said second location.

* * * * *